(12) United States Patent
Parikh et al.

(10) Patent No.: US 8,184,939 B2
(45) Date of Patent: May 22, 2012

(54) OPTICAL FIBER CABLE INLET DEVICE WITH INTEGRAL OPTICAL DEVICE

(75) Inventors: Rutesh D. Parikh, Austin, TX (US);
William G. Allen, Austin, TX (US);
Thomas E. Bludau, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 343 days.

(21) Appl. No.: 12/507,533

(22) Filed: Jul. 22, 2009

(65) Prior Publication Data
US 2010/0027955 A1    Feb. 4, 2010

Related U.S. Application Data

(60) Provisional application No. 61/085,584, filed on Aug. 1, 2008.

(51) Int. Cl.
*G02B 6/00* (2006.01)
(52) U.S. Cl. ........................................... 385/135
(58) Field of Classification Search .......... 385/135
See application file for complete search history.

(56) References Cited

U.S. PATENT DOCUMENTS

| | | | |
|---|---|---|---|
| 4,408,353 A | 10/1983 | Bowen et al. | |
| 5,745,633 A | 4/1998 | Giebel et al. | |
| 5,894,536 A * | 4/1999 | Rifkin et al. | 385/99 |
| 5,943,462 A * | 8/1999 | Schofield et al. | 385/100 |
| 6,028,974 A | 2/2000 | Shyu | |
| 6,222,977 B1 * | 4/2001 | Kawada et al. | 385/136 |
| 6,269,214 B1 | 7/2001 | Naudin et al. | |
| 6,487,344 B1 * | 11/2002 | Naudin et al. | 385/100 |
| 6,539,160 B2 | 3/2003 | Battey et al. | |
| 7,146,090 B2 * | 12/2006 | Vo et al. | 385/138 |
| 2006/0120672 A1 | 6/2006 | Cody et al. | |
| 2007/0003204 A1 | 1/2007 | Makrides-Saravanos et al. | |
| 2007/0025677 A1 | 2/2007 | Harrison et al. | |
| 2009/0060421 A1 * | 3/2009 | Parikh et al. | 385/71 |

FOREIGN PATENT DOCUMENTS

WO   WO 2009/067311 A1   5/2009
WO   WO 2009/126411 A1   10/2009

OTHER PUBLICATIONS

Form PCT/ISA/210, dated Jan. 29, 2010, issued in PCT/US2009/051418.

* cited by examiner

*Primary Examiner* — Sung Pak
(74) *Attorney, Agent, or Firm* — Janet A. Kling

(57) ABSTRACT

An inlet device is described for inserting a cable containing optical fibers into a telecommunications enclosure. The inlet device includes a housing and an optical device holder. The optical device holder may be configured to hold an optical fiber spice and/or an optical device such as an optical splitter, coupler or a dense wavelength division multiplexing (DWDM) device.

16 Claims, 10 Drawing Sheets

OPTICAL FIBER CABLE INLET DEVICE WITH INTEGRAL OPTICAL DEVICE

CROSS REFERENCE TO RELATED APPLICATION

This application claims the benefit of U.S. Provisional Patent Application No. 61/085,584, filed Aug. 1, 2008, the disclosure of which is incorporated by reference herein in its entirety.

FIELD OF THE INVENTION

The present invention relates to an inlet device having an optical device mounted therein. The inlet device is used to insert a cable containing optical fibers into a telecommunication's enclosure, e.g. into a terminal closure, pre-stubbed terminal, optical network terminal, a fiber distribution hub, or other junction box.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on. These networks are often referred to as fiber to the premise (FTTP) or fiber to the home (FTTH) networks.

As optical telecommunication networks reach closer to the end user, passive optical devices are being moved from the central office and large fiber distribution hubs further out into the network where conservation of space and ease of installation are important factors. In conventional distributed passive optical network (PON) for fiber to the premise networks, passive optical devices are placed into telecommunication enclosures and small distribution units in the form of modules which are then fusion or mechanically spliced to an incoming optical fiber in a distribution cable. This arrangement necessitates that at least one splice tray and/or a passive optical device module be included in the enclosure which takes up valuable real estate within the enclosure. Therefore, a need exists for a way to add passive optical devices into the fiber optic network that does not require significant space within the telecommunication enclosure or distribution box.

A conventional watertight inlet device is described in U.S. Pat. No. 6,487,344 which can be inserted into a port in the wall of a telecommunications enclosure.

A special sealed, hardened optical connector or plug solution is being deployed currently in some drop cables used in FTTP networks. This system provides for the optical connection to be made proximate to the wall of a terminal closure which may cause service interruptions when subjected to harsh environmental conditions. This connector platform requires a specific mating receptacle be mounted in the wall of the closure. Finally, the design of the connector and receptacle make cleaning of the optical interface difficult, prior to the installation of service.

SUMMARY OF THE INVENTION

In a first embodiment of the invention, an inlet device can be configured to be mounted on a communication cable. The inlet device can include a housing having a first end and a second end, an optical device holder and a compression member. The housing includes a compressible portion at the second end of the housing. The compression member is attachable over the compressible portion of the housing. The optical device holder is attachable to the first end of the housing. The optical device holder is configured to hold at least one of a fiber optic splice and an optical device disposed in the optical device holder.

In an alternative embodiment of the invention, an inlet device has a housing having a first end and a second end, an optical device holder. The housing has an internal strength member securing section configured to fasten at least one strength member of a communication cable within the housing in a securing well at the second end of the housing. The optical device holder is attachable to the first end of the housing. The optical device holder is configured to hold at least one of a fiber optic splice and an optical device disposed in the optical device holder. In one aspect, the housing can further include an orientation control section formed on an outer surface of the housing, a groove to receive an external sealing member formed in the outer surface of the housing, and a receiving channel formed in the outer surface of the housing.

In another embodiment, the inlet device may be mounted on a predetermined length of a communication cable to form an optical fiber cable assembly. The optical fiber cable assembly may be secured in a port of a telecommunication enclosure.

BRIEF DESCRIPTION OF THE DRAWINGS

The present invention will be further described with reference to the accompanying drawings, wherein.

Figure 1:
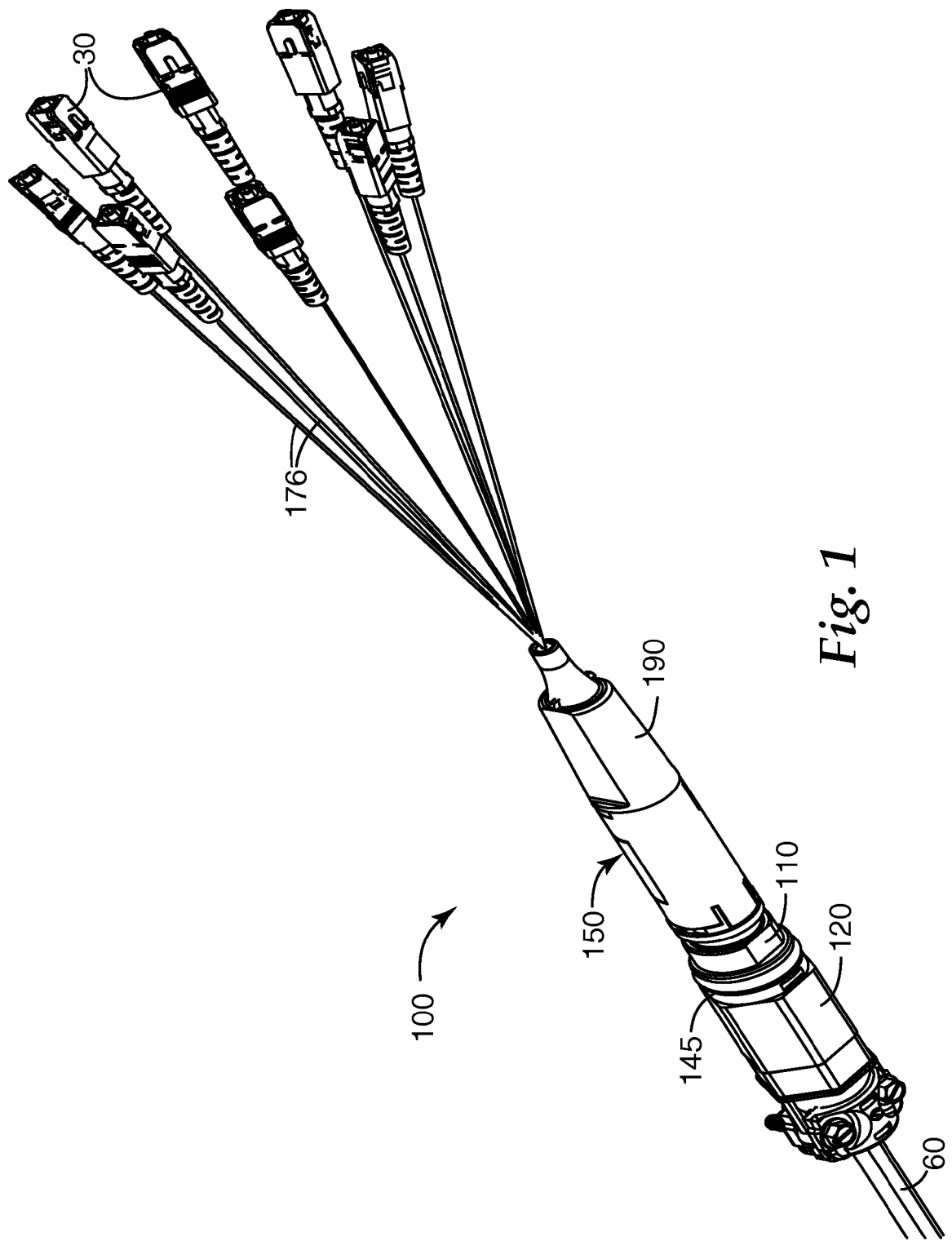
FIG. 1 shows an isometric view of an inlet device according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an inlet device for the insertion of an optical fiber cable into a telecommunications enclosure, wherein the inlet device includes an optical component. The optical component can be a passive optical component such as an optical fiber splice, an optical splitter, coupler, wavelength division multiplexing (WDM) device, or a dense wavelength division multiplexing (DWDM) device. Alternatively, the optical component can be an active optical device such as a pigtailed light source (e.g. a laser diode or laser module), photodetector, or optical switch. Particular advantages of the design of the present inlet device include the factory installation of the optical component in a preterminated optical fiber cable assembly. Moving the optical component into the inlet device saves real estate in the telecommunication enclosure and provides a rugged inlet assembly suitable for the outside plant environment. Also, the exemplary inlet device is designed to provide an environmental seal when installed in a telecommunications enclosure. By providing an environmental seal, the inlet device can be designed to provide a watertight or water resistant seal and/or to prevent dust, bugs or any other foreign substance from entering the enclosure.

The exemplary inlet device may be fitted to a communication cable, such as an optical fiber cable, and inserted into a port in a telecommunication enclosure to secure the telecommunication cable in the port. The optical fiber cable will contain one or more optical fibers. Each optical fiber will have a polymeric coating that surrounds and protects the central glass fiber. The strength members are generally in the form of at least one semi-rigid rod of compacted aramid fibers. If more than one of these semi-rigid strength members is present in the multi-fiber cable they may be positioned around the optical fiber ribbon cable or the protective tubes. Alternatively the multi-fiber cable may have a combination of a semi-rigid central strength member and a plurality of loose or woven flexible strength members surrounding the optical fiber ribbon cable or the protective tubes. A cable jacket surrounds and protects the optical fibers and the strength members.

Depending on the communication network architecture, the telecommunication enclosure may be a buried closure, an aerial closure or terminal, a fiber distribution hub or an optical network terminal in the outside plant or a wall mount communication box or terminal in a premise, apartment or multi-dwelling unit, fiber distribution hub, a wall mount patch panel, or an optical network terminal in premise applications.

Figure 2:
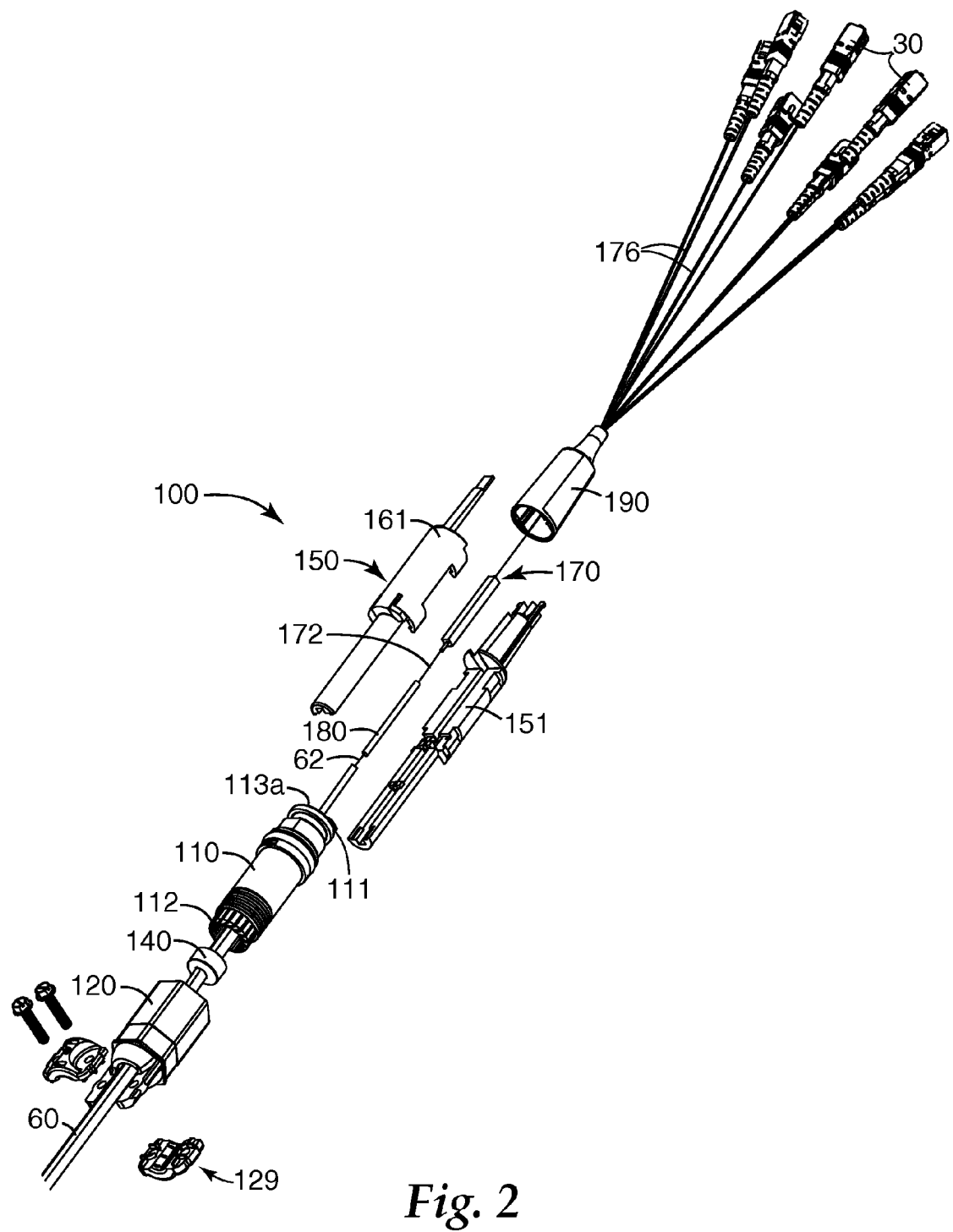
FIG. 2 shows an exploded view of an inlet device according to an embodiment of the present invention.

Referring to FIGS. 1 and 2, an exemplary inlet device 100 includes a housing 110 having a first end 111 and a second end 112, a compression member attachable to the second end 112 of the housing and an optical device holder. The compression member may be a clamping nut 120 or other device capable of applying a radial force to the second end 112 of the inlet device housing 110. Alternatively, the compression member can be a shrinkable elastomeric sleeve such as a heat shrink sleeve or a cold shrink sleeve that can provide a sufficient radial force on the second end 112 of the inlet device housing 110 when collapsed. The inlet device 100 may be formed of plastic by conventional methods, for example by injection molding.

Figure 5:
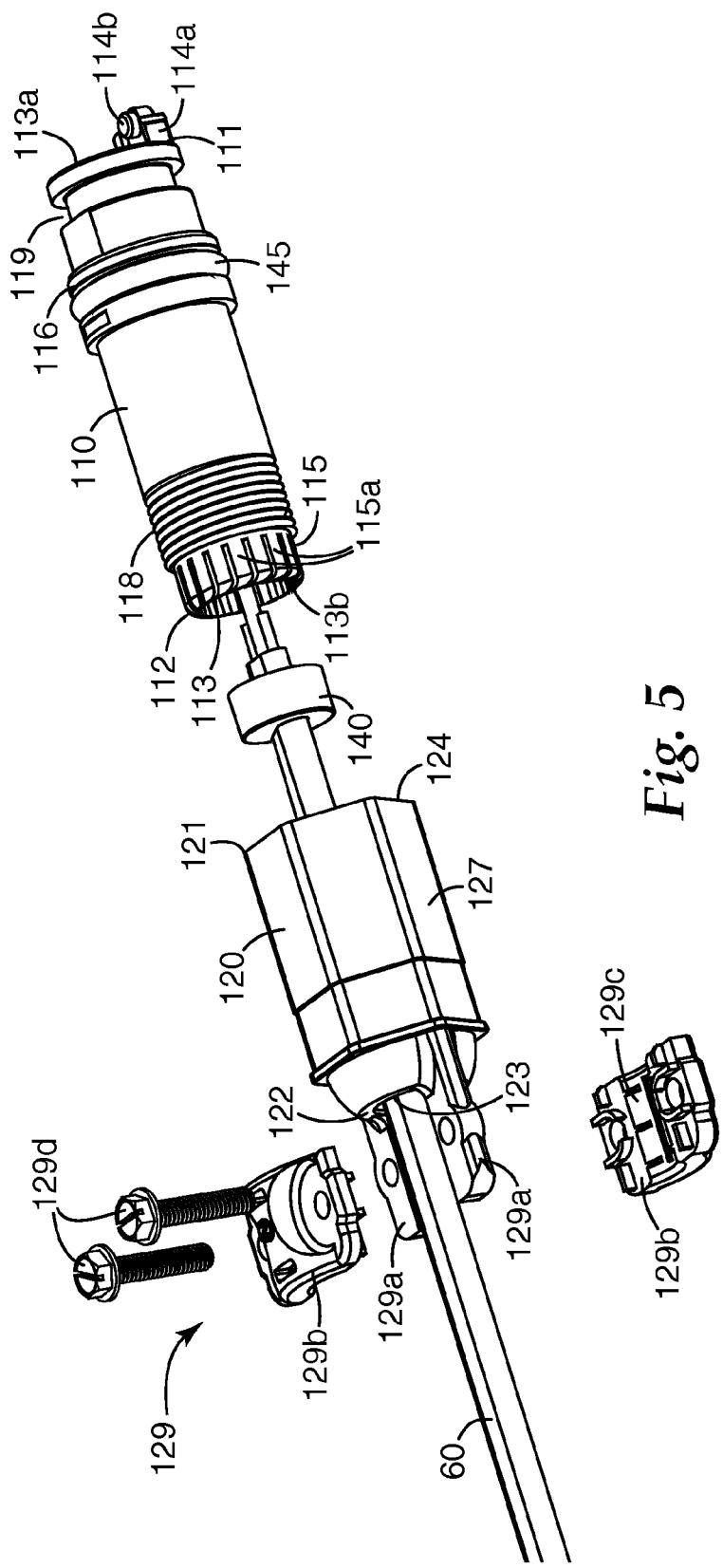
FIG. 5 shows a detail view of a portion of the inlet device of FIG. 2.

Referring to FIG. 5, the housing 110 may be generally cylindrical in shape and includes an interior passageway 113 that extends along the length of the housing from the first end 111 to the second end 112 of the housing. The housing includes a passage entry 113a at the first end 111 of the interior passageway 113 and a passage exit 113b at the second end 112 of the interior passageway 113. The passageway 113 may be configured to accommodate certain categories of telecommunication cables including single fiber cables or multi-fiber cables.

Figure 8A:
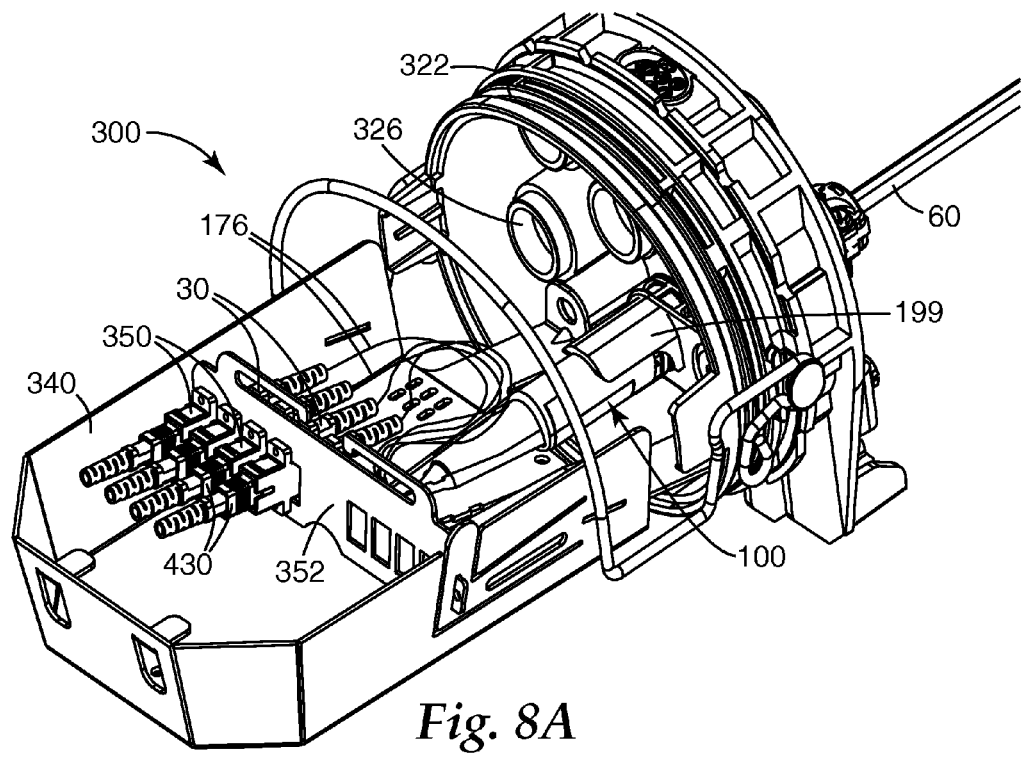
FIGS. 8A and 8B show an isometric view of the installation of an exemplary inlet device into a telecommunications enclosure according to an embodiment of the present invention.
Figure 8B:
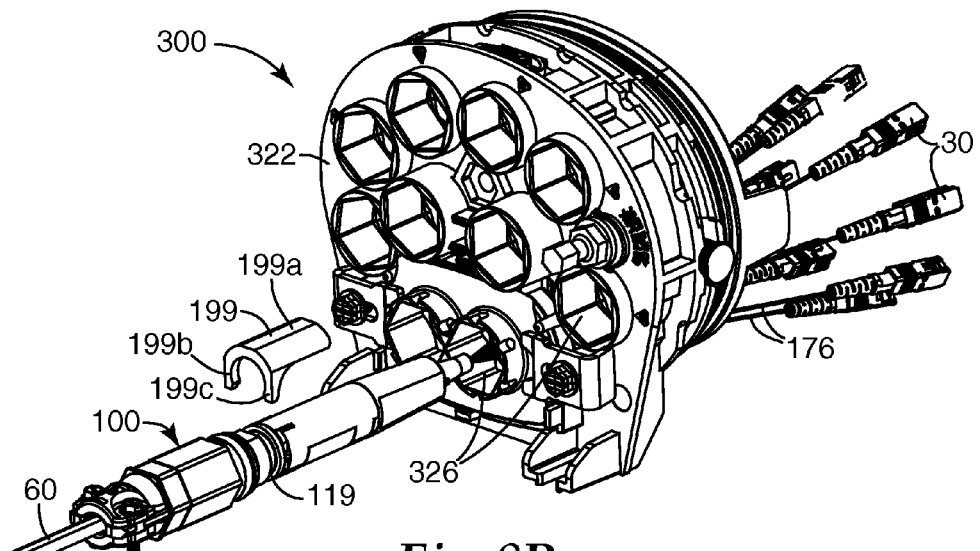

Referring to FIG. 8A and 8B, the first end of the housing will reside inside the telecommunication enclosure when the inlet device 100 has been fully inserted into a port 326 of a telecommunication enclosure. A locking fork 199 can be inserted into receiving channel 119 on housing 110 of inlet device 100 to secure the inlet device in the port of the telecommunication enclosure. The second end of the housing may be located within the port of the telecommunication enclosure when the inlet device has been fully inserted into a port of a telecommunication enclosure. Alternatively, the second end of the tubular body may extend completely through the port of the telecommunication enclosure.

Referring to FIG. 5, a groove 116 may be located between the first end 111 and the second end 112 of housing 110 to receive an external sealing member 145 such as an o-ring. This external sealing member 145 can provide an environmental seal between the inlet device 100 and a port of a telecommunication enclosure when the inlet device is fully seated therein.

The housing 110 can have an external threaded portion 118 located between groove 116 and the second end 112 of the housing 110. The external threaded portion 118 cooperates with a corresponding internal threaded portion (not shown) of a compression member (e.g. clamping nut 120) to cause a compressible portion 115 of the housing 110 to be constricted around an internal sealing member 140 to hold the cables installed therein.

The compressible portion 115 is formed at the second end 112 of the housing 110. The compressible portion 115 may be reduced in size (diameter) when an external radial force is exerted on it such as by application of the clamping nut 120. The compressible portion 115 may include a plurality of spaced apart flexible fingers 115a which surround the passage exit 113b. In an exemplary aspect of the housing, the fingers can be oriented in an overlapping angular arrangement. The fingers 115a may be squeezed together when a compression member, such as clamping nut 120, is attached to the second end of the housing 110. An optional internal sealing member 140 may be fitted into the interior passageway 113 in the compressible portion 115 of the housing 110 to improve the sealing capability of the inlet device 100 around at least one telecommunication cable as needed in an outdoor telecommunication enclosure installation. The telecommunication cable 60 passes through the internal sealing member 140 when the cable is installed into the inlet device 100. The tightening of the clamping nut 120 over the compressible portion 115 of the housing 110 compresses the internal sealing member 140 around the communication cable 60. In some applications such as in premise installations, a lesser degree of environmental protection is required and the internal sealing member 140 may be omitted.

The cable clamping nut 120, shown in FIGS. 2 and 5, has an interior chamber (not shown) extending between the first side 121 and a second side 122 of the clamping nut. The interior chamber has a first opening 124 at the first side 121 to accept the second end 112 of housing 110. The interior chamber has a smaller second opening 123 at the second side 122 of the clamping nut 120 to accommodate the passage of a telecommunication cable 60 therethrough. The interior chamber has an internal threaded portion (not shown) that corresponds to and is engagable with the external threaded portion 118 on the housing 110 to allow the cable clamping nut 120 to be secured to the housing.

In an exemplary embodiment, clamping nut 120 can have a gripping surface 127 on the external surface of the cable clamping nut that corresponds to the position of the internal threaded portion. The external gripping surface 127 may be a hexagonally shaped cross-section as shown in FIG. 5 to facilitate gripping of the cable securing device with a tool or by hand. The gripping surface region may have other geometric configurations such as a circular cross-section, a rectangular cross-section or other polygonal cross-section. Additionally, the gripping surface may be textured (e.g. a ridged or cross-hatched texture) to further facilitate gripping of the cable securing device. In addition, the gripping surface can provide the added benefit of preventing rotation of the inlet device when the gripping surface has a noncircular cross-section and is installed in a port in a telecommunication enclosure having a complimentary mating structure.

Clamping nut 120 includes a retaining clamp 129 disposed on the second side 122 of the clamping nut to securely hold a telecommunication cable 60. Two longitudinal side tabs 129a project from the second side 122 of clamping nut 120. Two halves 129b of retaining clamp 129 may be secured to the longitudinal side tabs by conventional mechanical fasteners 129d such as by screws or rivets. The interior surface 129c of the two clamp halves may be concave and have ridges or barbs to bite into the sheath of the telecommunication cable to further securely grip the telecommunications cable when it is installed into an exemplary inlet device. In an alternative embodiment, one of the halves of the retaining clamp may be integrally formed with the longitudinal side tabs to reduce the number of parts required. Alternative forms of cable clamping nuts are described in U.S. patent application Ser. No. 61/043652, which is incorporated by reference herein in its entirety. Optionally, the clamping nut may include a cable sizing insert (not shown) which can be placed around the cable and inserted into the clamping nut prior to attaching the clamping nut to the second end of the housing to accommodate a wide range of cable diameters.

The inlet device 100 may be formed of any suitable plastic material. In one embodiment, the housing, compression member, optical device holder, cover and locking key are formed of polymeric materials by methods such as injection molding, extrusion, casting, machining, and the like. For example, these parts may be made of molded polypropylene, nylon, polypropylene/nylon alloys or glass filled versions of these polymers. Material selection will depend upon factors including, but not limited to, chemical exposure conditions, environmental exposure conditions including temperature and humidity conditions, UV exposure conditions, flame-retardancy requirements, material strength, and rigidity, to name a few.

Figure 3A:
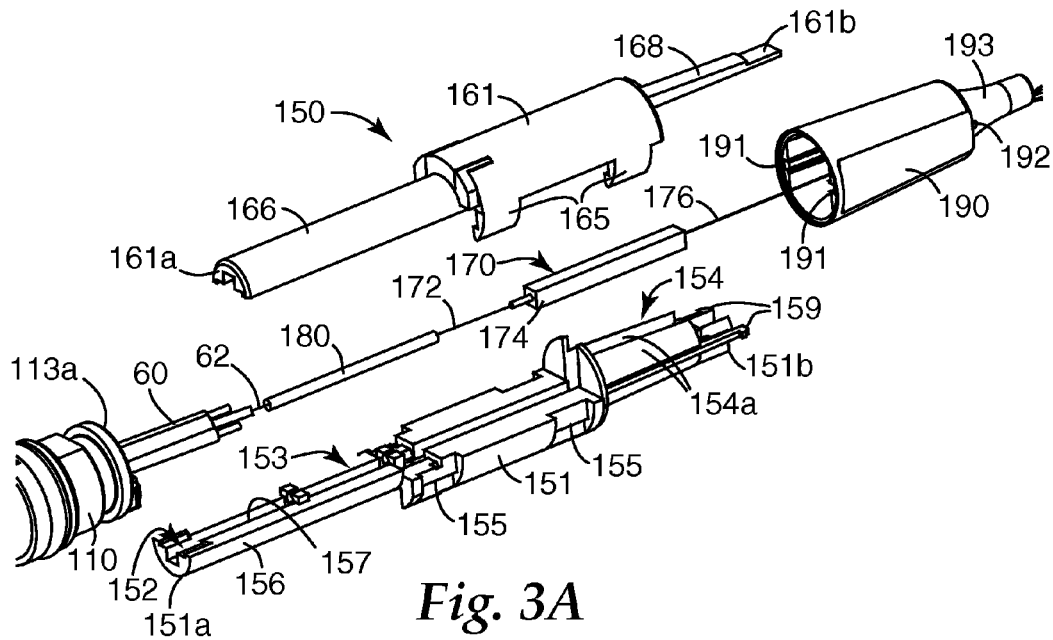
FIG. 3A shows an exploded close-up view of an optical device holder of the inlet device of FIG. 1.
Figure 3B:
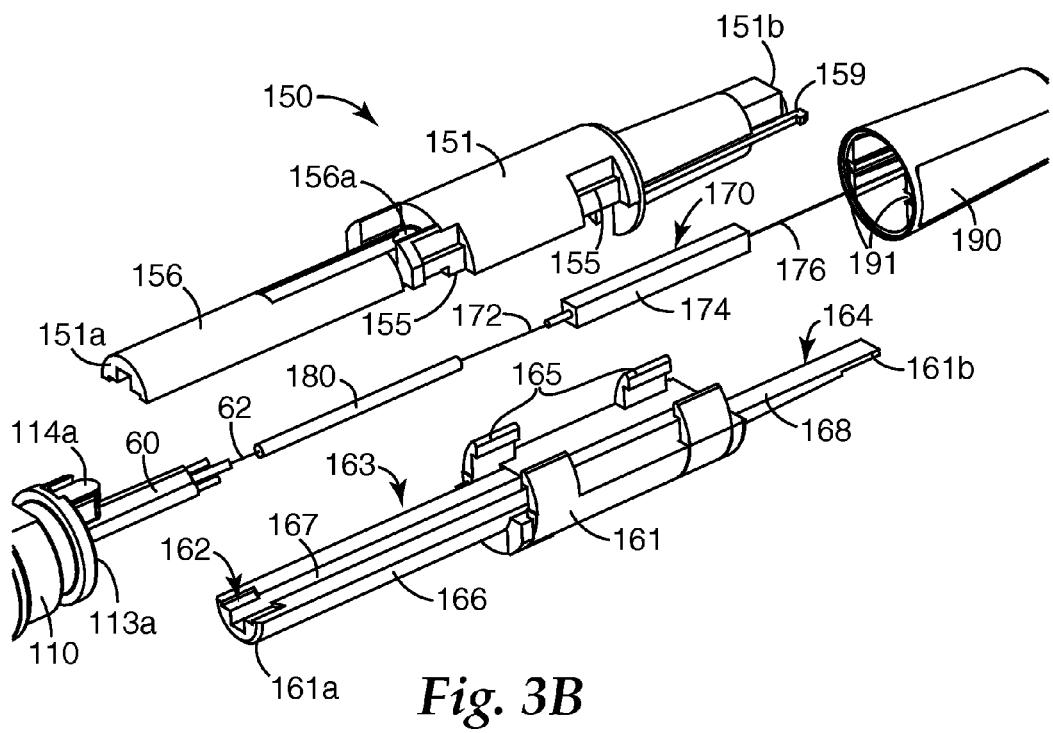
FIG. 3B shows another exploded close-up view of an optical device holder of the inlet device of FIG. 1.
Figure 3C:
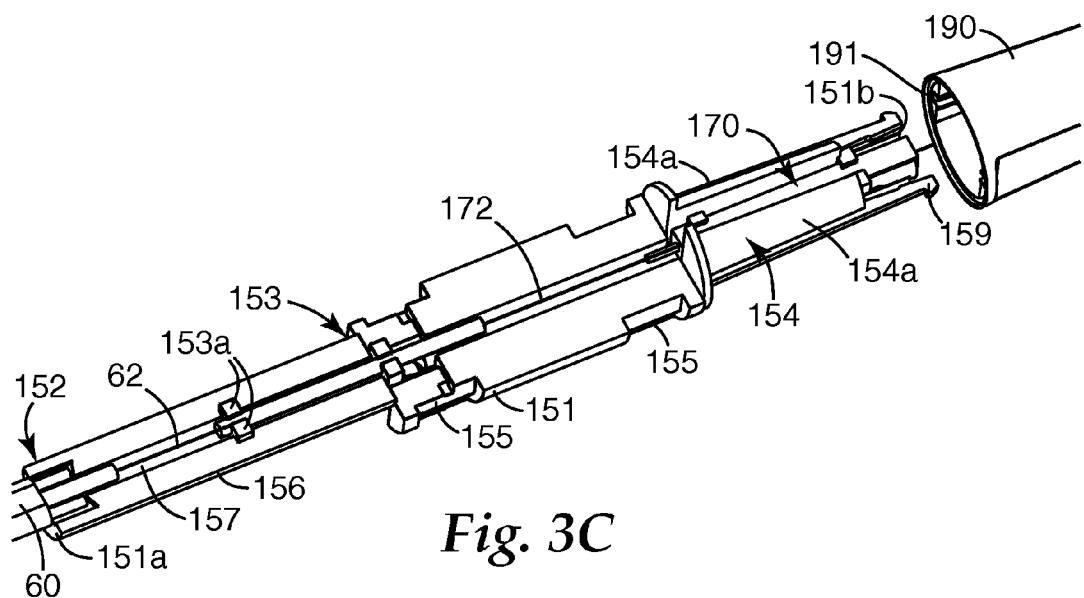
FIG. 3C shows an isometric view of the base of the optical device holder of FIG. 3A.

FIGS. 3A-3C show several aspects of an exemplary optical device holder 150 for holding an optical device 170 and an optical fiber splice 180. In an exemplary embodiment, the optical device can be an optical splitter device. The splitter device may be a 1×2 splitter, 1×4 splitter, as shown in FIG. 6A, 1×8 splitter, as shown in FIGS. 1 and 2, or other 1×n splitter. Additionally, the splitter device may be a 2×8 splitter, 2×16 splitter, other 2×n splitter, or m×n splitter. Typically, a splitter device includes an input fiber 172, a splitter 174 and a plurality of exit fibers 176. The optical fiber splice 180 may be used to splice an optical fiber 62 from an optical fiber cable 60 to the input fiber 172 of the splitter device 170. Each exit fiber 176 can each have an optical fiber connector 30 mounted to the end opposite the splitter device.

For example, optical connectors 30 may be mounted on the end of the individual fibers exiting the inlet device. Connectors 30 may be single fiber connectors such as a SC, DC, SC-DC, ST, FC, or LC connectors, to name a few, and may be, for example, either a positive contact (PC) or an angled polished connector (APC) type of connector. Alternatively, the connectors may be multi-fiber style connectors such as MT, OGI, MTP or MPO connectors. Sample single fiber connectors include 3M™ No Polish Connector SC Plug, 3M™ Hot Melt LC Connector, and 3M™ CRIMPLOK™ ST SM 126 UM Connector and a sample multi-fiber connectors includes 3M™ OGI multi-fiber connector, each of which is available from 3M Company (St. Paul, Minn.). In some embodiments of the present invention, no connectors may be put on the end of the optical fiber, instead the free ends of the optical fiber may be spliced into the network in a splice tray after the inlet device has been installed in a telecommunication enclosure using either fusion splices or mechanical splices such as 3M™ Fibrlok™ II mechanical splices available from 3M company (St. Paul, Minn.). Alternatively, a field mountable connector such as a 3M™ SC No Polish Connector available from 3M Company (St. Paul, Minn.) may be mounted on the exit fibers.

In an exemplary embodiment, the optical device holder 150 comprises a base 151 and lid 161 which may be secured to each other to enclose an optical device 170 and/or an optical fiber splice 180. The base and cover may be separate pieces as shown in FIGS. 3A and 3B, be two pieces that are hingedly connected or may be two portions of single piece joined by a living hinge. The device holder can be essentially cylindrical in shape and have a diameter that is no larger than the diameter than the maximum diameter of housing 110 to facilitate installation of the preassembled inlet device into the port of a telecommunication enclosure. The length of the optical device holder is determined by the length of the optical components (i.e. optical device, optical fiber splice) residing therein.

Referring to FIGS. 3A and 3C, the base 151 has cable gripping portion 152 located at a first end 151a of the base, a device holding portion 154 located at a second end 151b of the base, and a splicing portion 153 located between the cable gripping portion and the device holding portion. A variable width channel 157 interconnects the gripping portion 152 at the first end 151a of base 151 to the device holding portion 154 at the second end 151b of the base. The width and depth of the variable width channel 157 may be constant or it may vary depending on the size of the components (i.e. optical device, optical fiber splice) residing therein.

In the cable gripping portion 152, the variable width channel 157 has a width and a depth sufficient to snugly hold the optical fiber cable onto which the optical device holder 150 is mounted. If the inlet device is being attached to a round optical fiber cable, the width of the variable width channel 157 will be approximately two times the channel's depth. If the inlet device is being attached to a flat or oval optical fiber cable, the width and depth of the variable width channel 157 will be determined by the external dimensions of the cable. Varying the depth of the channel facilitates maintaining alignment of the light path of each of the portions of optical fiber and the components within the optical device holder, thus minimizing micro-bends which could degrade the optical signal.

In the cable splicing portion 152, the variable width channel 157 has a width and depth necessary to snugly hold an optical fiber splice such as 1.2 mm, 2.4 mm or 3.0 mm diameter fusion splice or a mechanical splice such as 3M™ Fibrlok™ II 2529 Universal Optical Fiber Splice or 3M™ Fibrlok™ 250 μm Fiber Splice 2540G available from 3M Company (St. Paul, Minn.). Optionally, the width of the channel can be significantly larger than the width of the optical fiber splice. In this embodiment, there may be resilient tabs located within the channel to securely hold the optical fiber splice in place. Alternatively a small piece of double sided tape, putty or adhesive may be used to keep the optical fiber splice from moving around in channel 157.

In the device holding portion 154, the variable width channel 157 has a width and a depth necessary to snugly hold the optical device. In one exemplary embodiment, the device holding portion may have high side walls 154a enclosing the variable width channel 157 such that the optical device 170 may be fully contained within the channel. Optionally, the width of the channel can be significantly larger than the width of the optical device 170. In this embodiment, there may be resilient fingers (not shown) located within the channel to securely hold the optical device in place. Alternatively a small piece of double sided tape, putty or adhesive may be used to keep the optical device from moving around in channel 157.

Alternatively, the optical components (i.e. optical device and/or the optical fiber splice) may be mechanically secured within the optical device holder. Optionally, the components may be potted or encapsulated within the optical device holder to provide additional environmental protection.

Base 151 can have a plurality of catches 155 that interact with latches 165 of the lid 161 to secure the lid to the base once the optical fiber splice 180 and the optical device 170 have been installed in the base.

Lid 161 is designed to mate with base 151. The lid has a first end 161a and a second end 161b that corresponds to the first and second ends 151a, 151b of base 151. Lid 161 can have a structure that is complimentary to the structure of base 151, including cable gripping portion 162 located at a first end 161a of the lid, a device holding portion 164 located at a second end 161b of the lid, and a splicing portion 163 located between the cable gripping portion 162 and the device holding portion 164. A variable width channel 167 can interconnect the gripping portion 162 at the first end 161a of lid 161 to the device holding portion 164 at the second end 161b of the lid. The width and depth of the variable width channel 167 may be constant or it may vary depending on the size of the components (i.e. optical device, optical fiber splice) residing therein. In an exemplary embodiment, the device holding portion 164 of the lid 161 may be in the form of a cap 168 that can be inserted into the variable width channel 157 in device holding portion 154 between walls 154a of base 151 to securely hold the optical device in the channel.

Figure 4:
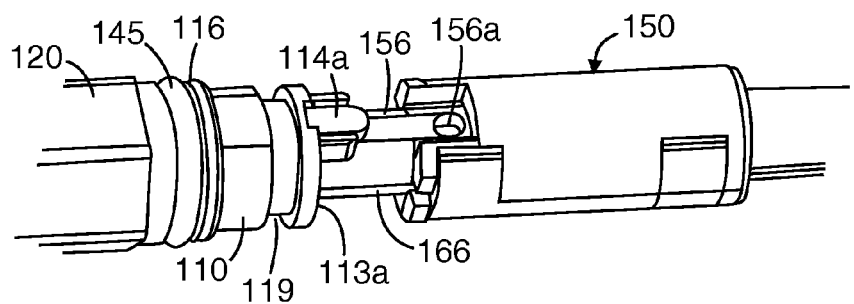
FIG. 4 shows a detail view of the assembly of the optical device holder of an exemplary inlet device according to an embodiment of the present invention.

Additionally, base 151 and/or lid 161 can have tongue portions 156, 166, respectively, which can be inserted into the passage entry 113a of housing 110 when the optical device holder 150 is installed in the inlet device (see FIG. 4). The optical device holder 150 may be slid into the housing 110 until positioning bump 114b on extension 114a of housing (FIG. 5) engages with a depression or hole 156a on tongue 156 of the base 151 to fix the position of the optical device holder in the housing. Alternatively the depression or hole may be located on tongue 166 of lid 161 of the optical device holder. In an alternative, only one of the lid or base has a tongue. In this case, the optical device holder may be secured to the first end 111 of the housing 110 such as by the insertion of the tongue on the device holder into the passage entry 113a of the housing. The tongue may be positioned below guides (not shown) disposed on the wall of the interior passageway 113 of housing 110. The guides may be in the form of a pair of longitudinal ridges located on opposing sides of the interior passageway and that extend along a length of the interior passageway. Alternatively, the guides may be in the form of a series of spaced apart bumps located on opposing sides of the interior passageway and that extend along a length of the interior passageway. The guides control the vertical position of the optical device holder in the housing. The optical device holder can be slid into the housing 110 until positioning bump 114b on extension 114a of housing engages with a depression or hole in the tongue of the optical device holder to fix the horizontal position of the optical device holder in the housing.

Additionally, base 151 can include a pair of hooks 159 which can engage with openings 192 on cover 190 which protects device holding portion 154 and further secures base 151 to lid 161 when it is attached to optical device holder 150. Engagement of hooks 159 of the optical device holder with slots 191 inside of cover 190 ensure that the optical device holder is centered inside of the cover when the cover is secured to the inlet device. Cover 190 can have a funnel-shaped fiber exit port 193 to guide and position the exit fibers 176 as they leave optical device holder 150. Optionally, an optional fiber strain relief boot (not shown) may be slipped over the funnel shaped portion of the funnel-shaped exit port 193 to provide strain relief to the exit fibers 176.

In a passive optical network (PON), a telecommunication enclosure such as a fiber distribution terminal (FDH), a fiber distribution terminal (FDT) or a local convergence cabinet may be used in the outside plant to make the connection between the service provider and its subscribers. In conventional PON systems, a fiber optic cable from the central office is routed into a telecommunication enclosure where it is connected to an input fiber of a splitter module which is housed within the enclosure. The signal is then separated by the splitter module and exits the splitter module on a plurality of exit fibers. These exit fibers may then be interconnected with individual drop cables from each subscriber. As the reach of PON systems grow closer to the subscriber, there is a need for compact and/or high density distribution terminals. Using an inlet device, such as is described herein, allows the removal of the splitter module from the distribution terminal. This structure can provide more space within the terminal to allow more connections with subscribers. Also, this structure can enable the use of a smaller distribution terminal to service the same number of subscribers.

Similarly, the exemplary inlet device may be used in distribution boxes in multi-dwelling units to increase density in an existing box and/or reduce the size of the box needed.

In an exemplary embodiment of the current invention, the inlet device, such as device 100 having a 1×4 splitter therein may be factory assembled to yield a preterminated cables assembly. This preterminated cable assembly can be used in a PON to distribute a broadband communication signal from a service provider to multiple subscribers.

FIGS. 6 and 7A-7D show another exemplary embodiment of an inlet device 200. The inlet device includes a housing 210 having a first end 210a and a second end 210b and an optical device holder 150 attachable to the housing at the second end. The housing is generally cylindrical in shape and includes an interior passageway 203a (FIG. 7C) that extends along the length of the housing from the first end to the second end of the housing. The housing has a passage entry 203 that may be configured to accommodate certain categories of communication cables (i.e. round cables, flat cables, etc.). In particular, inlet device 200 may be preferred when dealing with a communication cable 60 having a semi-rigid outer sheath surrounding a loose buffer tube 65 containing one or more optical fibers, and a pair of strength members 68 located on either side of the buffer tube. Similar cables include ResiLink ADF™ All-Dielectric Flat Drop Cable available from Pirelli Cables and System (Columbia, N.C.), and Mini DP Flat Drop Cable available from OFS (Northcross, Ga.). The optical fiber has a polymeric coating that surrounds and protects the glass fiber. The strength members may be either semi-rigid rods or a collection of loose fibers e.g. made of aramid fibers.

In addition, the housing 210 has an internal strength member securing section 211 formed in an interior portion of the housing. The strength member securing section can be configured to fasten at least one strength member 68 to the housing. The strength member securing section includes an opening or passageway 211a for the optical fibers to pass through and at least one opening 211b for passage of at least one strength member into at least one securing well or chamber 211c (see FIGS. 7C and 7D). When a strength member 68 is inserted into a securing well 211c, it can be locked in place by at least one mechanical fastener or pin 298 which passes through a hole 211d in a wall of the securing well such that the strength member 68 is trapped between the end of the mechanical fastener and the opposing wall of the securing well. The mechanical fasteners or pins 298 may be optionally inset in recesses 211e in the outer wall of the housing.

Other features of the housing 210 include primary and secondary cable strain relief attachment surfaces (212, 213), an orientation control section 217, a groove 216 to hold an external sealing member 245, a receiving channel 219 and an optical device holder attachment section 214.

The primary cable strain relief attachment surface 212 is located between the passage entry 203 and the secondary cable strain relief attachment surface 213. The secondary cable strain relief attachment surface 213 is located between the primary cable strain relief attachment surface 212 and the orientation control section 217. The outside circumference of the primary cable strain relief attachment surface is smaller than the circumference of the secondary cable strain relief attachment surface so that a three-part cable sealing and strain relief member 270 (see FIG. 9) can be attached to the housing without substantially increasing the overall diameter of the housing. The three-part cable sealing and strain relief member secures and seals the communication cable 60 to the housing 210. This cable strain relief member also provides a strain relief to the communication cable by maintaining the proper bend radius of the cable when it is installed in a telecommunications enclosure. Also, the cable strain relief member provides retention of the cable against pull-out forces.

In one embodiment, the primary and secondary cable strain relief attachment surfaces (212, 213) may have a smooth surface texture. In another embodiment, the primary and secondary cable strain relief attachment surfaces may have a ribbed, undulating or other rough surface texture. FIGS. 7A-7D show an embodiment of the primary and secondary cable strain relief attachment surfaces having ribs 215. It may be advantageous to have a rough ribbed, undulating or other rough surface texture on the primary and secondary cable strain relief attachment surfaces to improve mechanical strength of the connection of the housing to the cable sealing and strain relief member 270.

Figure 6:
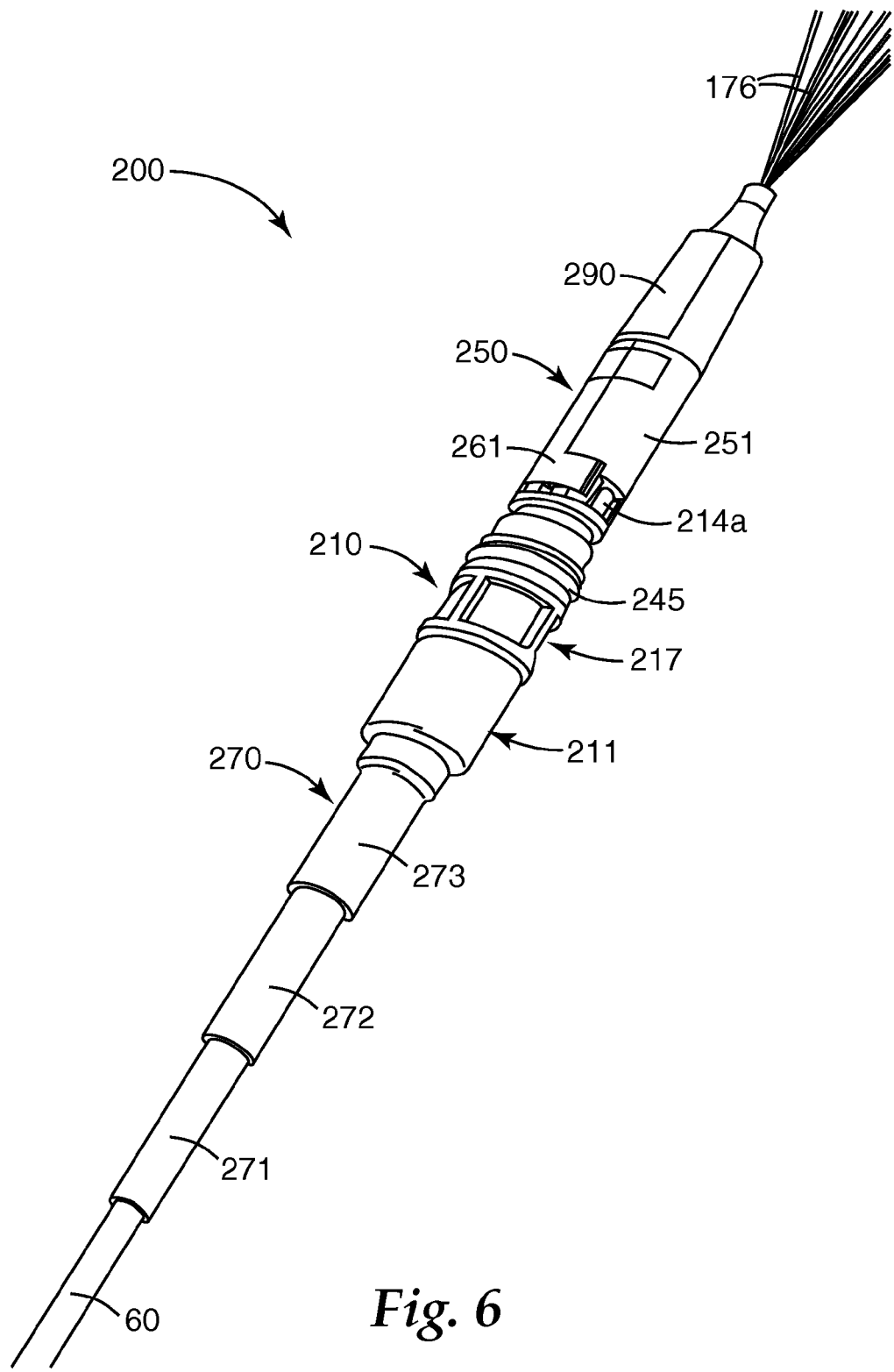
FIG. 6 shows an isometric view of an inlet device according to another embodiment of the present invention.
Figure 7A:
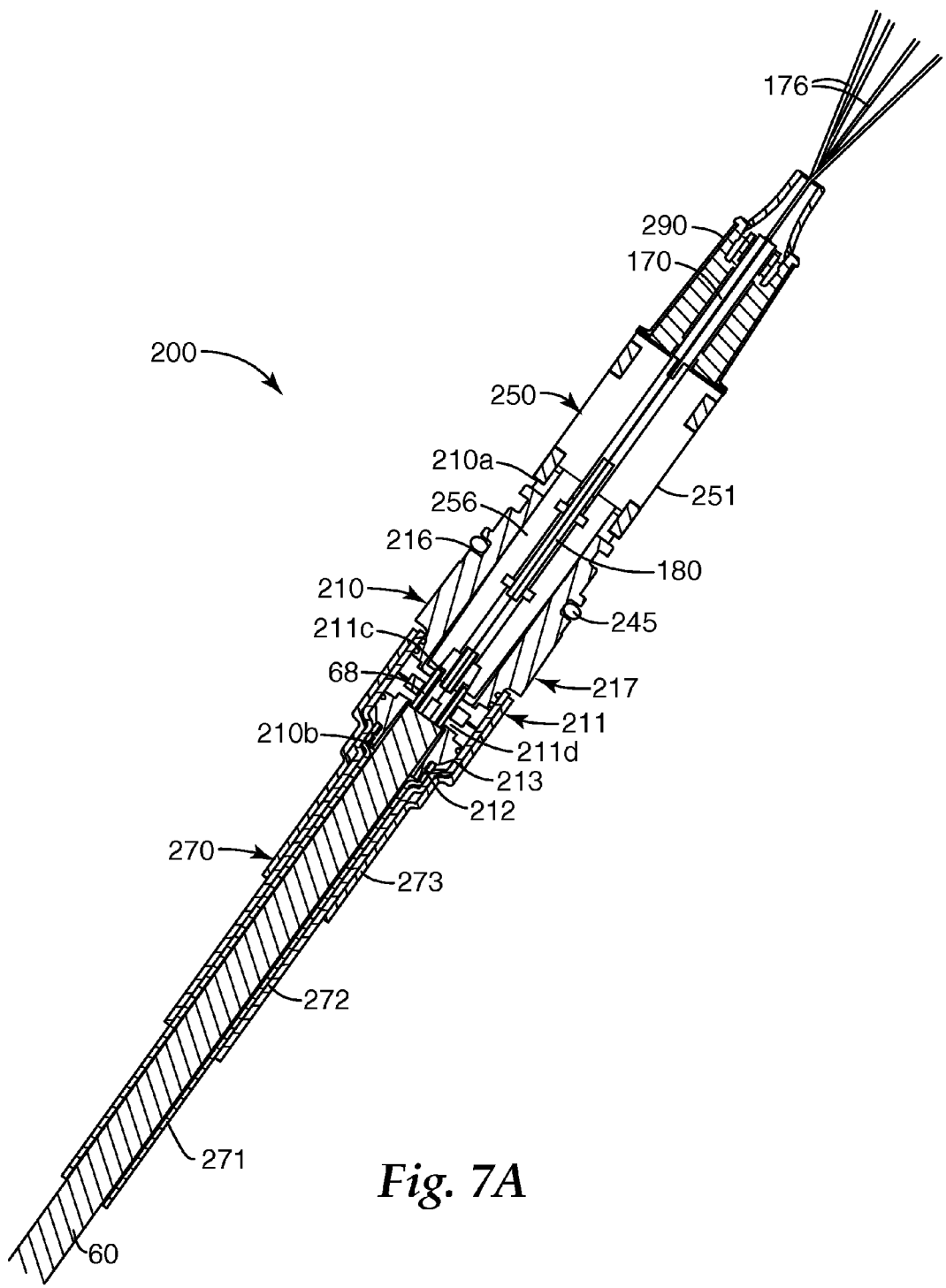
FIGS. 7A-7D show a series of cross sectional views of the inlet device of FIG. 6.
Figure 7B:
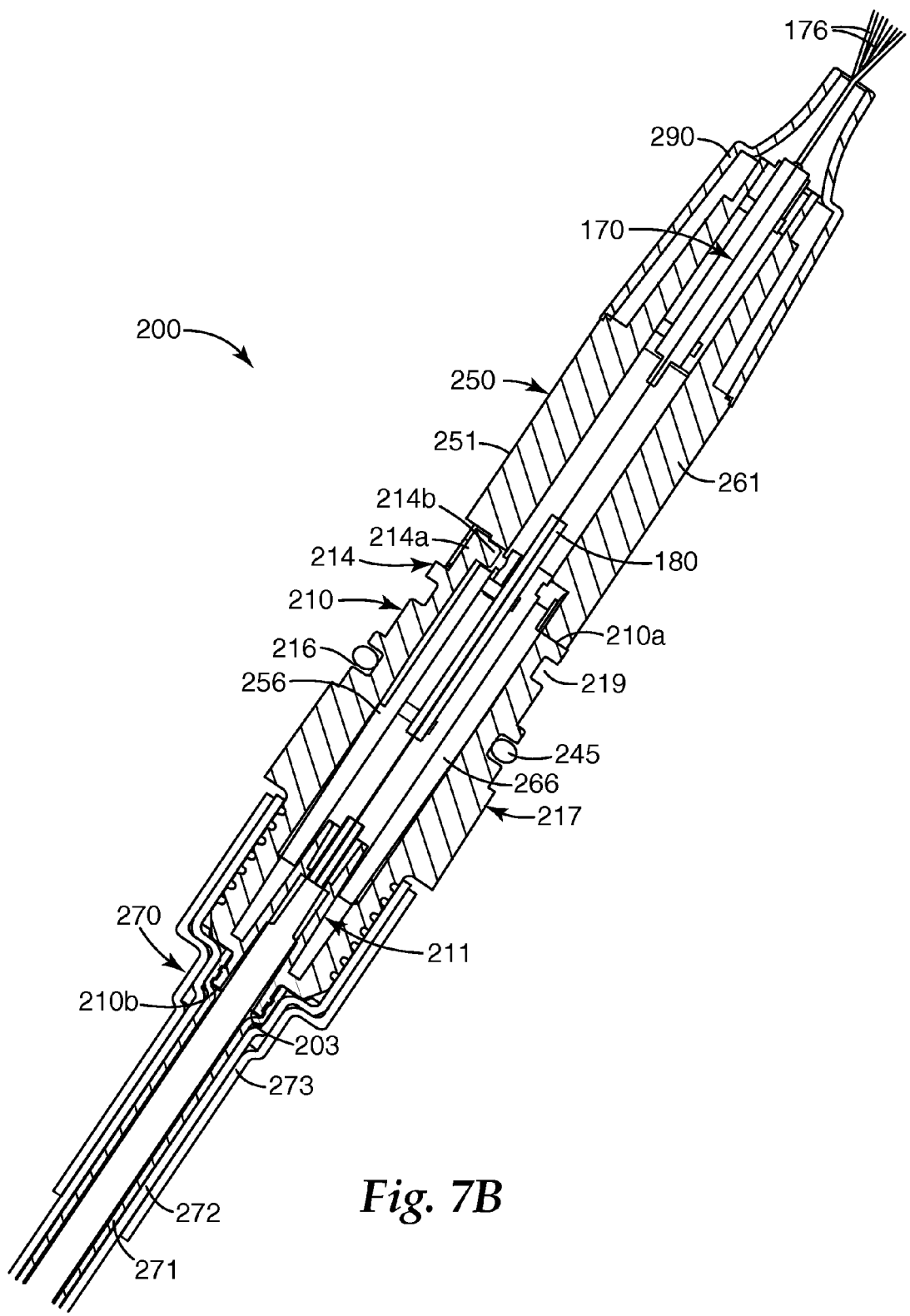
Figure 7C:
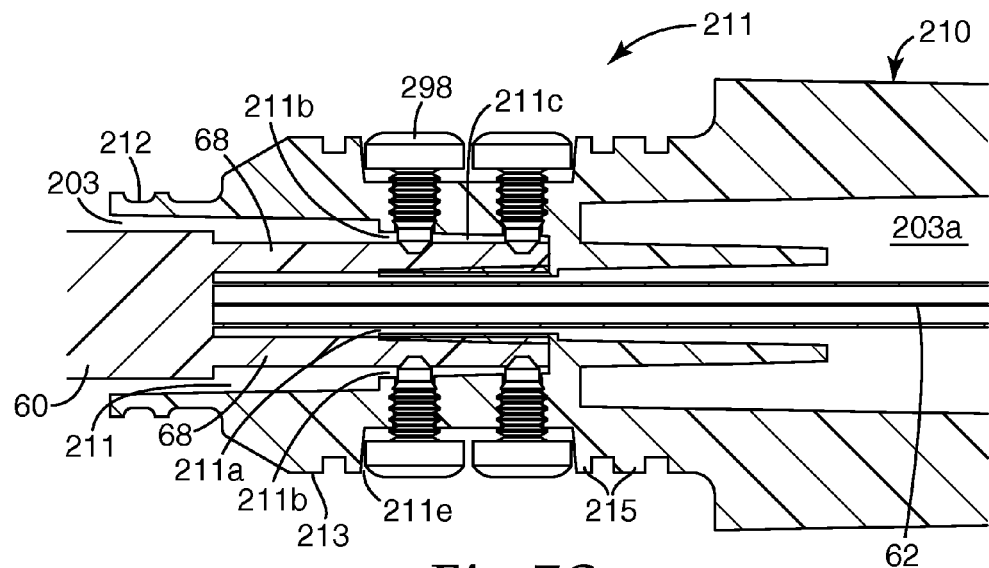
Figure 7D:
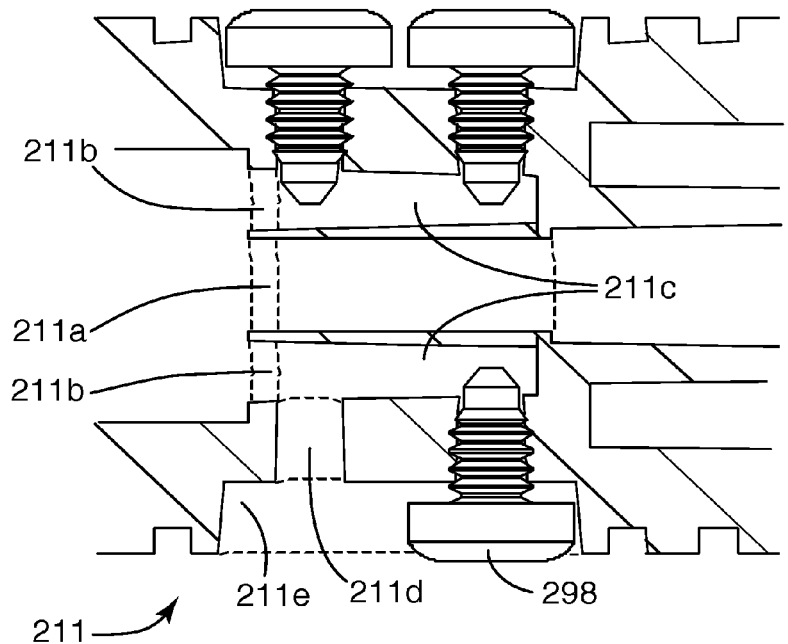

The three-part cable sealing and strain relief member 270 can be made up of three layers, a primary layer 271, a secondary layer 272, and a tertiary layer 273 as shown in FIG. 6, which surrounds a portion of the cable jacket. The primary layer 271 of the cable sealing and strain relief member attaches to the primary cable strain relief attachment surface 212 and extends for some distance from the end of the housing (e.g. about 3 in (7.6 cm) to about 6 in (15.2 cm)). The secondary layer 272 of the cable sealing and strain relief member attaches to the secondary cable strain relief attachment surface 213 and extends over the primary layer 271 of the cable sealing and strain relief member 270 for some length beyond the end of the housing 210. The tertiary layer 273 reinforces the secondary layer 272 from the secondary cable strain relief attachment surface 213 to just past the primary cable strain relief attachment surface 212. The layers 271, 272, 273 of the cable sealing and strain relief member 270 may include molded preformed strain relief boots, a recoverable sleeve, or adhesive coated heat shrink tubing such as ATUM and TAT Heat shrink tubing available from Tyco Electronics Corporation (Harrisburg, Pa.) and HDT tubing available from 3M Company (St. Paul, Minn.).

The orientation control section 217 may be utilized when the inlet device 200 is inserted into a complementary port structure in a telecommunications enclosure in a known or controlled orientation. In FIG. 6, the orientation control section is positioned on the housing 210 between the secondary cable strain relief attachment surface 213 and groove 216 which is configured to hold external sealing member 245. The external dimensions of the orientation control section may be somewhat larger than the remainder of the housing. In some embodiments of the current invention, the orientation control section determines the ultimate cross-sectional diameter of the inlet device. Portions of the orientation control section may form abutment surfaces which extend from the generally cylindrical surface of the housing. These abutment surfaces can cooperate with a shoulder in the port of a telecommunications enclosure to properly seat the inlet device in a telecommunications enclosure. The structure of the orientation control section of a similar inlet device is described in U.S Patent Publication No. 2009-0060421-A1, which is incorporated by reference herein.

The external sealing member 245 is positioned in groove 216 in the housing. The groove is preferably situated proximate to the orientation control section. In one embodiment the external sealing member 245 is a rubber o-ring.

The receiving channel 219 can be in the form of a groove or trench and can be located between groove 216 and the optical device holder attachment section 214. A locking key 199 (FIGS. 8A and 8B) may be inserted into the receiving channel to securely fasten the device in the port of the telecommunications closure. The exemplary locking key has a handle 199a and two tines (199b, 199c) which extend from the handle. The two tines fit into the receiving channel 216 on either side of the housing 210 to prevent the device from slipping in the port.

The optical device holder attachment section 214 of the housing is configured at the first end 210a of the housing to secure optical device holder 250 to inlet device 200. As described previously, the optical device holder 250 can include a base 251 and lid 261 which may be secured to each other to enclose an optical device 170 and/or an optical fiber splice 180. The base 251 and the lid 261 of optical device holder 250 can have tongue portions 256, 266, respectively, which can be inserted into the first end of the interior passageway 203a of housing 210 when the optical device holder 250 is installed in the inlet device (see FIGS. 7A and 7B). The optical device holder 250 may be slid into the housing 210 until positioning bump 214b on extension 214a of housing engages with a depression or hole (not shown) on tongue 256 of the base 251 to fix the position of the optical device holder in the housing. Alternatively the depression or hole may be located on tongue 266 of lid 261 of the optical device holder. In an alternative, only one of the lid or base has a tongue. In this case, the optical device holder may be secured to the first end of the housing such as by the insertion of the tongue on the device holder into the first end of the interior passageway of the housing. The tongue may be positioned below guides disposed on the wall of the interior passageway. The guides may be in the form of a pair of longitudinal ridges located on opposing sides of the interior passageway and that extend along a length of the interior passageway. Alternatively, the guides may be in the form of a series of spaced apart bumps located on opposing sides of the interior passageway and that extend along a length of the interior passageway. The guides control the vertical position of the optical device holder in the housing. The optical device holder can be slid into the housing 210 until positioning bump 214b on extension 214a of housing engages with a depression or hole in the tongue of the optical device holder to fix the horizontal position of the optical device holder in the housing. A cover 290 may attached to optical device holder 250 to protect the device hold and further secure base 251 to lid 261.

The inlet device 200 may be formed of any suitable plastic material. In one embodiment, the housing, fiber retainer, fiber guide plates, cover and locking key are formed of polymeric materials by methods such as injection molding, extrusion, casting, machining, and the like. For example, these parts may be made of molded polypropylene, nylon, polypropylene/nylon alloys or glass filled versions of these polymers. Material selection will depend upon factors including, but not limited to, chemical exposure conditions, environmental exposure conditions including temperature and humidity conditions, UV exposure conditions, flame-retardancy requirements, material strength, and rigidity, to name a few.

The inlet device 100 on a preterminated cable assembly may be inserted into a port 326 in the base platform 322 of a telecommunication enclosure as is shown in FIGS. 8A and 8B. An exemplary telecommunication enclosure is described more fully in United States Patent Publication No. 2009-0060421-A1, which is incorporated by reference herein in its entirety. The telecommunication enclosure includes a base platform 322 and a dome-shaped cover (not shown). The dome-shaped cover is removeably securable to the base platform. The dome-shaped cover can be configured to fit over and engage with the base platform 322 in a conventional manner. When engaged, the base platform 322 and the housing provide protection for the internal components of the terminal from weather, insects and other external hazards.

The base platform 322 includes at least one port 326 for receiving exemplary inlet device 100. The base platform may have one, two, or any other number ports 326 as is required for a particular enclosure. Once the inlet device has been installed into a port 326 of base platform 322 and secured in place by engaging locking key 199 with the receiving channel 119 of the inlet device, the connectors 30 on the terminal ends of exit fibers 176 may be fitted into a coupling field 350 mounted on a bracket 352 attached to support frame 340. A preconnectorized drop cable (not shown) may be attached to the inlet device by inserting a drop cable connector 430 into the other side of each coupling in the coupling field when a subscriber requests broadband service. An optional separation plate (not shown) can be mounted on frame 340 to separate the fibers of the preterminated cable assembly from the fibers of the drop cables to protect and prevent tangling.

Another feature of the separation plate is that it provides craft separation in the enclosure. The multi-fiber cable assembly may be pre-installed in the closure at the factory and the separation plate added when the terminal is installed into the network. When the service provider needs to set up service for a particular end user, the service provider can send a craftsman to install a preterminated drop cable assembly (not shown) between the terminal and the subscriber. An exemplary preterminated drop cable assembly is described more fully in United States Patent Publication No. 2009-0060421-A1.

While the installation of the inlet device has been described with respect to its installation in a dome-style telecommunication enclosure system, the inlet device may be used in conjunction with other conventional telecommunication enclosure, closures, terminals, cabinets, optical network units, and other telecommunication junction boxes.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

We claim:

1. An inlet device configured to be mounted on a communication cable, the inlet device comprising:
   a housing having a first end and a second end, wherein the housing includes an interior passageway extending longitudinally through the housing having a passage entry at the first end of the housing and a compressible portion at the second end of the housing;
   a optical device holder attachable to the first end of the housing by inserting a tongue portion of the optical device holder into the passage entry; and
   a compression member attachable over the compressible portion of the housing.

2. The inlet device of claim 1, further comprising at least one of a fiber optic splice and an optical device disposed in the optical device holder.

3. The inlet device of one of claim 2, wherein the optical device is one of an optical splitter device, a coupler device, wavelength division multiplexing device, and a dense wavelength division multiplexing device.

4. The inlet device of claim 1, further comprising an internal sealing member fitted into the second end of the housing, wherein the communication cables passes through the internal sealing member and wherein the internal sealing member may be squeezed by the compressible portion of the housing when the compression member is attached to the second end of the housing.

5. The inlet device of claim 1, further comprising a cover axially positioned over the second end of the optical device holder.

6. The inlet device of claim 1, further comprising a locking mechanism configured to secure the inlet device into a port of a telecommunications enclosure.

7. The inlet device of claim 1, wherein the communication cable is a optical fiber cable and wherein the inlet device is mounted on an end of the optical fiber cable comprising at least one optical fiber.

8. The inlet device of claim 7, wherein the inlet device is secured in a port of a telecommunication enclosure.

9. An inlet device configured to be mounted on a communication cable, the inlet device comprising:

a housing having a first end and a second end, wherein the housing has a strength member securing section formed in an interior portion thereof and configured to secure at least one strength member of an optical fiber cable to the housing, wherein the strength member securing section comprises at least one securing well for retaining the at least one strength member disposed between the housing and an optical fiber passageway formed in the housing having a passage entry at the first end of the housing; and an optical device holder attached to the first end of the housing by inserting a tongue portion of the optical device holder into the passage entry.

10. The inlet device of claim 4, further comprising a cable sealing and strain relief member attached to the second end of the housing.

11. The inlet device of claim 4, further comprising at least one of a fiber optic splice and an optical device disposed in the optical device holder.

12. The inlet device of claim 11, wherein the optical device is one of an optical splitter device, a coupler device, wavelength division multiplexing device, and a dense wavelength division multiplexing device.

13. The inlet device of claim 9, further comprising a cover axially positioned over the second end of the optical device holder.

14. The inlet device of claim 9, further comprising a locking mechanism configured to secure the inlet device into a port of a telecommunications enclosure.

15. The inlet device of claim 9, wherein the communication cable is a optical fiber cable and wherein the inlet device is mounted on an end of the optical fiber cable comprising at least one optical fiber.

16. The inlet device of claim 15, wherein the inlet device is secured in a port of a telecommunication enclosure.

\* \* \* \* \*